(12) United States Patent
Inoue et al.

(10) Patent No.: US 10,373,338 B2
(45) Date of Patent: Aug. 6, 2019

(54) CALCULATION DEVICE, CAMERA DEVICE, VEHICLE, AND CALIBRATION METHOD

(71) Applicant: KYOCERA Corporation, Kyoto (JP)

(72) Inventors: Shushin Inoue, Yokohama (JP); Tomofumi Koishi, Tochigi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/576,781

(22) PCT Filed: May 26, 2016

(86) PCT No.: PCT/JP2016/002560
§ 371 (c)(1),
(2) Date: Nov. 24, 2017

(87) PCT Pub. No.: WO2016/189878
PCT Pub. Date: Dec. 1, 2016

(65) Prior Publication Data
US 2018/0165833 A1    Jun. 14, 2018

(51) Int. Cl.
*G01C 3/14*    (2006.01)
*G06T 7/80*    (2017.01)
(Continued)

(52) U.S. Cl.
CPC ............ *G06T 7/85* (2017.01); *G01C 3/14* (2013.01); *G01C 21/28* (2013.01); *G01C 25/00* (2013.01); *G06T 3/00* (2013.01); *H04N 5/247* (2013.01); *H04N 13/239* (2018.05); *H04N 13/246* (2018.05); *H04N 17/002* (2013.01); *G06K 9/00798* (2013.01); *G06T 2207/30256* (2013.01); *G08G 1/165* (2013.01); *G08G 1/166* (2013.01); *H04N 2013/0081* (2013.01)

(58) Field of Classification Search
CPC combination set(s) only.
See application file for complete search history.

(56) References Cited

U.S. PATENT DOCUMENTS 6,813,370 B1 * 11/2004 Arai .................. G06T 7/593
382/104
6,985,619 B1 * 1/2006 Seta .................. G06K 9/00798
382/154

(Continued)

FOREIGN PATENT DOCUMENTS

JP    2001-272210 A    10/2001
JP    3600378 B2    12/2004
(Continued)

OTHER PUBLICATIONS

International Search Report issued in PCT/JP2016/002560; dated Aug. 2, 2016.
(Continued)

*Primary Examiner* — Tsung Yin Tsai
(74) *Attorney, Agent, or Firm* — Studebaker & Brackett PC

(57) ABSTRACT

A calculation device comprises a controller configured to extract, from a captured image of a subject, a plurality of lines corresponding to straight lines parallel to each other in the subject, and to calculate first calibration data so that mapping lines obtained when the extracted plurality of lines are mapped to a three-dimensional coordinate space are parallel to each other.

10 Claims, 14 Drawing Sheets

(51) Int. Cl.
*G01C 21/28* (2006.01)
*G01C 25/00* (2006.01)
*G06T 3/00* (2006.01)
*H04N 5/247* (2006.01)
*H04N 17/00* (2006.01)
*H04N 13/246* (2018.01)
*H04N 13/239* (2018.01)
*G06K 9/00* (2006.01)
*G08G 1/16* (2006.01)
*H04N 13/00* (2018.01)

(56) References Cited

U.S. PATENT DOCUMENTS

| | | | | |
|---|---|---|---|---|
| 8,340,896 | B2* | 12/2012 | Saito | G01S 11/12 |
| | | | | 701/408 |
| 8,922,626 | B2* | 12/2014 | Aoki | G01C 3/085 |
| | | | | 348/47 |
| 9,378,553 | B2 | 6/2016 | Tamura et al. | |
| 2005/0237385 | A1* | 10/2005 | Kosaka | G01B 11/00 |
| | | | | 348/42 |
| 2006/0078197 | A1* | 4/2006 | Mitsumoto | G06K 9/00785 |
| | | | | 382/154 |
| 2007/0291125 | A1 | 12/2007 | Marquet | |
| 2008/0089557 | A1* | 4/2008 | Iwaki | G01C 3/06 |
| | | | | 382/106 |
| 2011/0242356 | A1* | 10/2011 | Aleksic | H04N 5/2258 |
| | | | | 348/222.1 |
| 2012/0236124 | A1 | 9/2012 | Aoki | |
| 2014/0133741 | A1* | 5/2014 | Wang | G06T 17/05 |
| | | | | 382/154 |
| 2015/0204687 | A1* | 7/2015 | Yoon | G01C 21/3658 |
| | | | | 701/436 |
| 2015/0279017 | A1* | 10/2015 | Tamura | G06K 9/00791 |
| | | | | 382/103 |

FOREIGN PATENT DOCUMENTS

| | | |
|---|---|---|
| JP | 2008-509619 A | 3/2008 |
| JP | 2012-198075 A | 10/2012 |
| JP | 2015-190921 A | 11/2015 |

OTHER PUBLICATIONS

Written Opinion issued in PCT/JP2016/002560; dated Aug. 2, 2016; with English language Concise Explanation.

* cited by examiner

CALCULATION DEVICE, CAMERA DEVICE, VEHICLE, AND CALIBRATION METHOD

CROSS REFERENCE TO RELATED APPLICATION

This application claims priority to and the benefit of Japanese Patent Application No. 2015-107969 filed on May 27, 2015, the entire disclosure of which is incorporated herein by reference.

TECHNICAL FIELD

The present disclosure relates to a calculation device, a camera device, a vehicle, and a calibration method.

BACKGROUND

A stereo camera device that calculates the distance to a subject using a plurality of cameras is known. For example, in the automotive field, the distance ahead to a vehicle, an obstacle, or the like is calculated using the stereo camera device. The calculated distance is used for driving assistance such as warning the driver to avoid a collision and controlling the accelerator and the brakes in automatic cruise control.

The stereo camera device calculates the distance from a difference between images captured by two cameras. An error in alignment of the two cameras causes a significant error in the calculated distance. Frequent calibration is therefore necessary. It is, however, difficult to perform such high-accuracy calibration by mechanical adjustment each time.

An electronic calibration method for automatically determining an alignment error based on images captured by cameras and correcting a distance depending on the determined alignment error has been proposed (for example see JP 2008-509619 A (PTL 1)). The electronic calibration method detects, from a right image and a left image captured by a stereo camera, two or more straight lines corresponding to road boundary marking lines arranged in parallel with each other on a road. The electronic calibration method then determines, for each of the left image and the right image, the coordinates of a vanishing point at which the two straight lines converge. The electronic calibration method compares the coordinates of the vanishing point between the left image and the right image, and determines an alignment error.

CITATION LIST

Patent Literature

PTL 1: JP 2008-509619 A

SUMMARY

Solution to Problem

A calculation device according to the present disclosure comprises a controller configured to extract, from a captured image of a subject, a plurality of lines corresponding to straight lines parallel to each other in the subject, and to calculate first calibration data so that mapping lines obtained when the extracted plurality of lines are mapped to a three-dimensional coordinate space are parallel to each other.

A camera device according to the present disclosure comprises: a calculation device including a controller configured to extract, from a captured image of a subject, a plurality of lines corresponding to straight lines parallel to each other in the subject, and to calculate first calibration data so that mapping lines obtained when the extracted plurality of lines are mapped to a three-dimensional coordinate space are parallel to each other; and one or more cameras configured to capture the image of the subject.

A vehicle according to the present disclosure comprises: a calculation device including a controller configured to extract, from a captured image of a subject, a plurality of lines corresponding to straight lines parallel to each other in the subject, and to calculate first calibration data so that mapping lines obtained when the extracted plurality of lines are mapped to a three-dimensional coordinate space are parallel to each other; and one or more cameras configured to capture the image of the subject.

A calibration method according to the present disclosure comprises: extracting, from a captured image of a subject, a plurality of lines corresponding to straight lines parallel to each other in the subject; and calculating first calibration data so that mapping lines obtained when the extracted plurality of lines are mapped to a three-dimensional coordinate space are parallel to each other.

DETAILED DESCRIPTION

The calibration method described in PTL 1 requires calculation of a vanishing point from parallel lines included in the captured images. According to such methods, in cases where the road surface is inclined, an accurate vanishing point cannot be calculated. According to the present disclosure, on the other hand, calibration can be performed without calculating the vanishing point of straight lines.

A plurality of embodiments is described below, with reference to the drawings.

Figure 1:
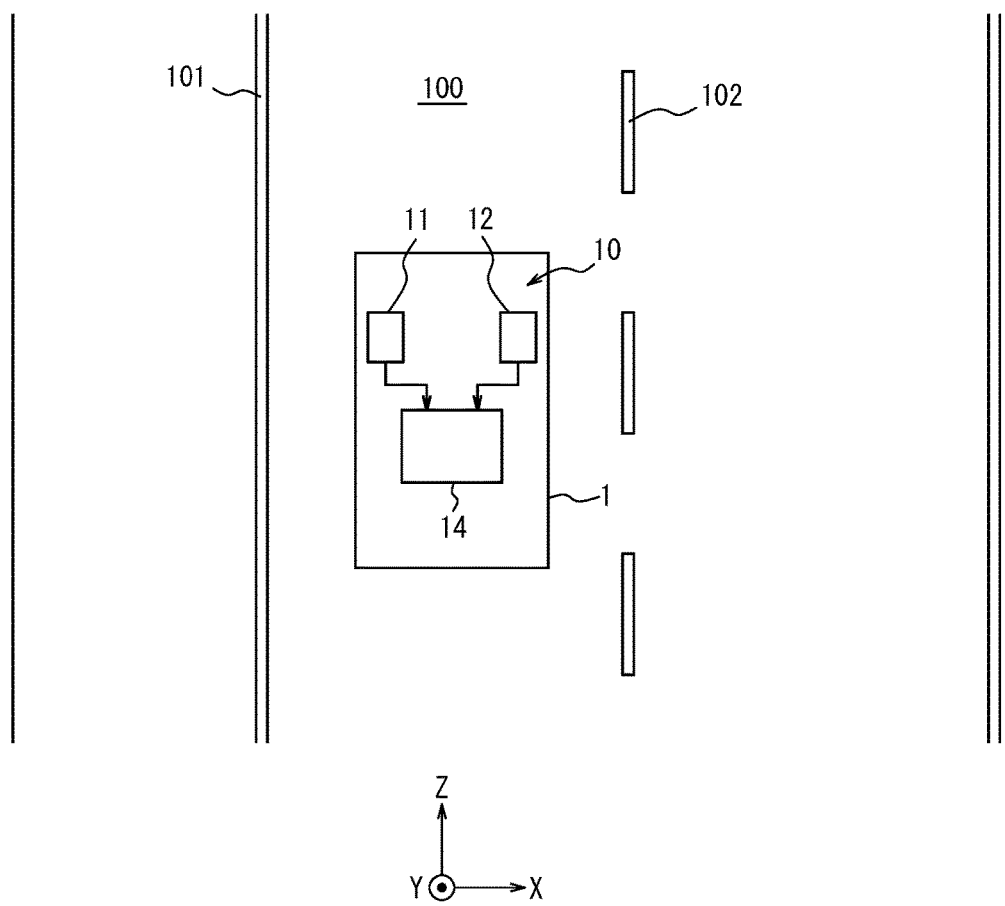
FIG. 1 is a simplified diagram illustrating a vehicle equipped with a camera device and running on a road.

In FIG. 1, the traveling direction of a vehicle 1 (the upward direction in the drawing) is referred to as the Z direction, the vehicle width direction of the vehicle 1 (the right-left direction in the drawing) is referred to as the X direction, and the direction orthogonal to the X direction and the Z direction (the direction orthogonal to the paper surface) is referred to as the Y direction. In the present disclosure, the traveling direction of the vehicle 1 (the upward direction in the drawing) is a positive direction in the Z direction, the direction from left to right is a positive direction in the X direction, and the direction from the ground to the sky is a positive direction in the Y direction.

The term "vehicle" in the present disclosure includes, but is not limited to, motor vehicles, railed vehicles, industrial vehicles, and domestic vehicles. For example, the vehicle may include airplanes running on runways. Motor vehicles include, but are not limited to, cars, trucks, buses, two-wheeled vehicles, and trolleybuses. Motor vehicles may include other vehicles running on roads. Track vehicles include, but are not limited to, locomotives, freight cars, passenger cars, tramcars, guide-rail type railroads, ropeways, cable cars, linear motor cars, and monorails. Track vehicles may include other vehicles traveling along tracks. Industrial vehicles include industrial vehicles for agriculture and construction. Industrial vehicles include, but are not limited to, forklifts and golf carts. Industrial vehicles for agriculture include, but are not limited to, tractors, cultivators, transplanters, binders, combines, and lawn mowers. Industrial vehicles for construction include, but are not limited to, bulldozers, scrapers, power shovels, crane trucks, dump trucks, and road rollers. Domestic vehicles include, but are not limited to, bicycles, wheelchairs, baby carriages, carts, and electrical standing-type two-wheel vehicles. Power engines for vehicles include, but are not limited to, internal-combustion engines such as diesel engines, gasoline engines, and hydrogen engines, and electrical engines such as motors. Vehicles include human-powered vehicles. The classifications of vehicles are not limited to the above. For example, motor vehicles may include industrial vehicles that can run on roads, and the same type of vehicle may belong to a plurality of classifications.

A camera device 10 includes a first camera 11, a second camera 12, and a calculation device 14. The two cameras, i.e. the first camera 11 and the second camera 12, are arranged to face outside the vehicle 1, and cooperate with each other as a stereo camera. In an embodiment, the calculation device 14 is electrically connected to the first camera 11 and the second camera 12. The calculation device 14 includes an image processing device.

Here, the term "stereo camera" refers to a plurality of cameras that have parallax and cooperate with each other. The stereo camera includes two or more cameras. The stereo camera can capture a subject from a plurality of directions by cooperation of the plurality of cameras. The stereo camera may be able to capture the subject simultaneously by cooperation of the plurality of cameras. Here, "simultaneous" image capture is not limited to image capture at the exact same time. For example, "simultaneous" image capture in the present disclosure includes: (1) image capture by the plurality of cameras at the same time; (2) image capture by the plurality of cameras based on the same signal; and (3) image capture by the plurality of cameras at the same time in the respective internal clocks. For example, the time reference for image capture is an image capture start time, an image capture end time, a captured image data transmission time, or a time at which image data is received by a destination device. The stereo camera may be a device that includes a plurality of cameras in one housing. The stereo camera may be a device that includes two or more cameras independent of each other and located separately from each other. The stereo camera is not limited to a plurality of cameras independent of each other. In the present disclosure, for example, a camera having an optical mechanism that guides light incident at two separate locations to one light receiving element may be used as the stereo camera. In the camera device 10, two cameras independent of each other, i.e. the first camera 11 and the second camera 12, are arranged. In the present disclosure, a plurality of images of the same subject captured from different visual points is also referred to as "stereo image".

The first camera 11 and the second camera 12 each include a solid-state image sensor. Examples of the solid-state image sensor include a charge-coupled device (CCD) image sensor and a complementary MOS (CMOS) image sensor. The first camera 11 and the second camera 12 may each include a lens mechanism.

The optical axis of each of the first camera 11 and the second camera 12 is in a direction that enables image capture of the same subject. The first camera 11 and the second camera 12 have different optical axes from each other. The optical axis and position of each of the first camera 11 and the second camera 12 are set so that their captured images include at least the same subject. The optical axes of the first camera 11 and the second camera 12 are parallel to each other. Here, the term "parallel" is not limited to being exactly parallel, but allows for deviation in assembly, deviation in mounting, and deviation with time. The optical axes of the first camera 11 and the second camera 12 are not limited to being parallel to each other, and may differ in direction from each other.

The first camera 11 and the second camera 12 are fixed to the vehicle body of the vehicle 1 so as to reduce a change in position and direction with respect to the vehicle 1. Even when the first camera 11 and the second camera 12 are fixed, their positions and directions might change with respect to the vehicle 1.

The optical axes of the first camera 11 and the second camera 12 are in the forward direction of the vehicle 1 (Z direction). The camera device 10 can capture images of various subjects, such as white lines 101 and 102 (division lines) on a road surface 100, vehicles ahead, and obstacles, while moving. The optical axes of the first camera 11 and the second camera 12 are inclined from the Z direction towards the road surface 100. The optical axes of the first camera 11 and the second camera 12 may be in the Z direction, or be inclined from the Z direction towards the sky. The directions of the optical axes of the first camera 11 and the second camera 12 are changed as appropriate depending on use.

The first camera 11 and the second camera 12 are located apart from each other in a direction which intersects their optical axes. In an embodiment, the first camera 11 and the second camera 12 are arranged along the vehicle width direction of the vehicle 1 (X direction). The first camera 11 is on the left side of the second camera 12 when facing forward, and the second camera 12 is on the right side of the first camera 11 when facing forward. Due to the difference in position between the first camera 11 and the second camera 12, the position of the corresponding subject differs between two images captured by the respective cameras 11 and 12. A left image output from the first camera 11 and a right image output from the second camera 12 constitute a stereo image captured from different visual points. The positions of the first camera 11 and the second camera 12 are not limited to the above. In another embodiment, the first camera 11 and the second camera 12 may be arranged along the up-down direction (Y direction) or an oblique direction in the XY plane. In such cases, respective images output from the first camera 11 and the second camera 12 constitute a stereo image having parallax in the up-down direction or the oblique direction.

In an embodiment, the first camera 11 and the second camera 12 are fixed to the front side of the vehicle 1, with their optical axes being in the forward direction of the vehicle 1 (Z direction). In an embodiment, the first camera 11 and the second camera 12 can capture an image of the outside of the vehicle 1 through the windshield of the vehicle 1. In some embodiments, the first camera 11 and the second camera 12 may be fixed to any of the front bumper, fender grille, side fender, light module, and hood of the vehicle 1.

The first camera 11 and the second camera 12 each output a captured image to the calculation device 14 as digital data. The calculation device 14 is capable of performing various processes on each of the left image output from the first camera 11 and the right image output from the second camera 12. The processes that can be performed by the calculation device 14 include a process to calibrate each of the first camera 11 and the second camera 12 for a deviation from a standard based on the image, and a process to detect an object from the image. The calculation device 14 calculates the distance to an object detected from both of the left image and the right image. The calculation device 14 may calculate the distance to the object by a well-known technique such as the principle of triangulation.

The calculation device 14 performs a process of calibration for a difference in the image attributable to a difference from an intended standard, such as manufacturing variation and deviation in mounting of the first camera 11 and the second camera 12. The calculation device 14 may perform at least one of a process of conducting calibration after developing image data into an image and a process of conducting calibration before developing image data into an image. To calibrate for temporal change with respect to the intended standard, the calculation device 14 may perform a process of updating calibration values used for image calibration. In an embodiment, the calculation device 14 may perform the process of updating the calibration values, on a regular basis. Here, a "calibration value" is a parameter used to calibrate input image data or an image developed from image data. A calibration value may be used in calibration for a deviation from standard camera position and direction. In this description, a calibration value and calibration data are synonymous. A calibration value update procedure is described in more detail below.

Figure 2:
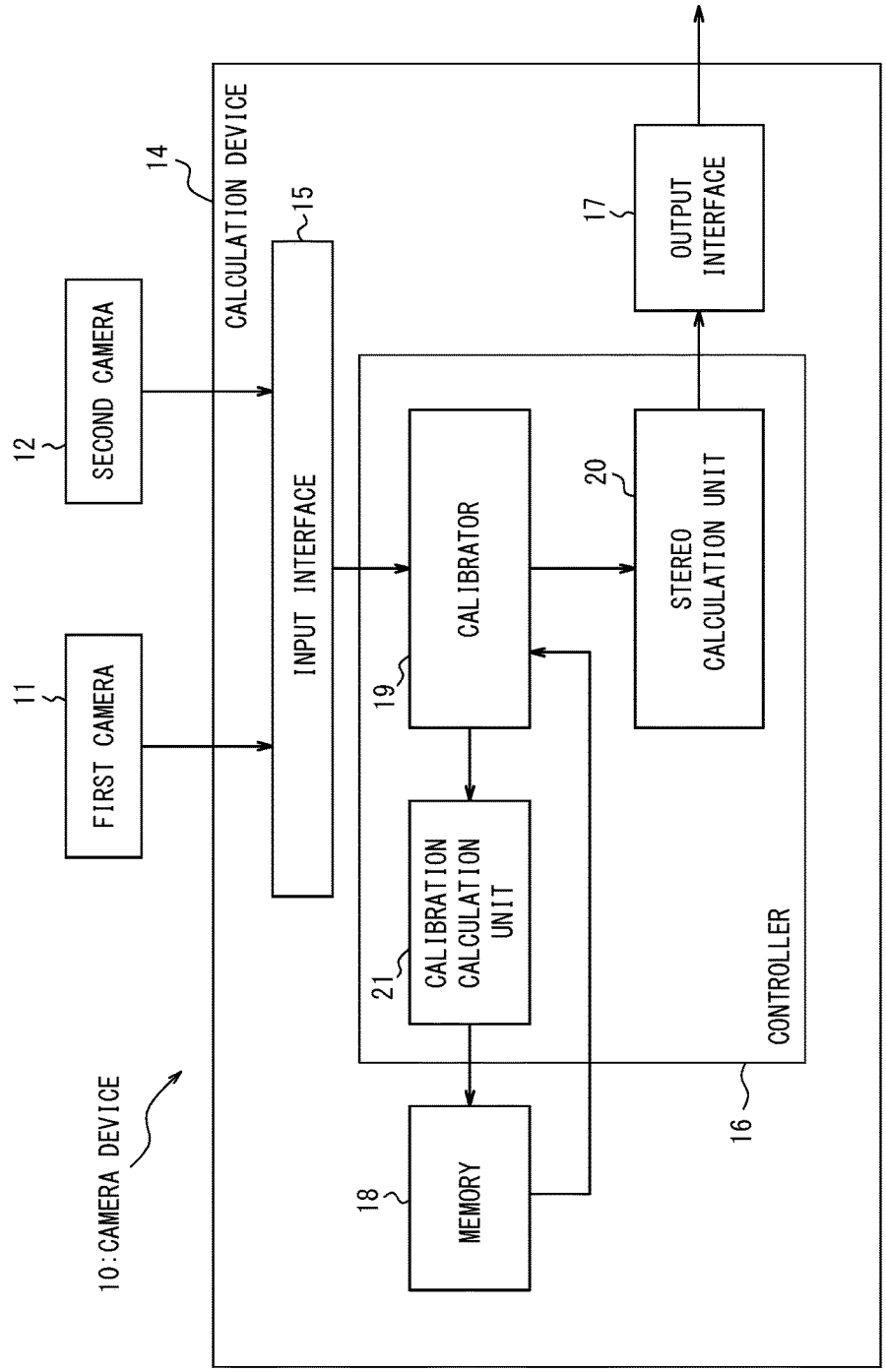
FIG. 2 is a block diagram illustrating a schematic configuration of a camera device according to an embodiment.

In FIG. 2, the camera device 10 includes the first camera 11, the second camera 12, and the calculation device 14. The calculation device 14 includes an input interface 15, a controller 16, an output interface 17, and a memory 18. The calculation device 14 may include, for example, a memory for temporarily storing image data input via the input interface 15, apart from the memory 18.

The input interface 15 is an input interface for inputting image data to the calculation device 14. The input interface 15 may include a physical connector or a wireless communication device. Examples of the physical connector include an electrical connector supporting electrical signal transmission, an optical connector supporting optical signal transmission, and an electromagnetic connector supporting electromagnetic wave transmission. Examples of the electrical connector include a connector conforming to IEC 60603, a connector conforming to the USB standard, a connector corresponding to an RCA connector, a connector corresponding to an S connector defined in EIAJ CP-1211A, a connector corresponding to a D connector defined in EIAJ RC-5237, a connector conforming to the HDMI® standard (HDMI is a registered trademark in Japan, other countries, or both), and a connector corresponding to a coaxial cable such as BNC. Examples of the optical connector include various connectors conforming to IEC 61754. Examples of the wireless communication device include wireless communication devices conforming to standards such as Bluetooth® (Bluetooth is a registered trademark in Japan, other countries, or both) and IEEE 802.11. The wireless communication device includes at least one antenna.

The input interface 15 receives image data of an image captured by each of the first camera 11 and the second camera 12. The input interface 15 passes the input image data to the controller 16. Input to the input interface 15 may be signals input via a cable or signals input via a wireless connection. The input interface 15 may support the captured image transmission scheme of the first camera 11 and the second camera 12.

The controller 16 includes at least one processor. The controller 16 or the processor may include one or more memories for storing a program for various processes and information during calculation. Such memory may be volatile memory or non-volatile memory. The memory may be separate from the processor, or internal to the processor. The processor may be a general-purpose processor for reading a specific program and executing a specific function, and a dedicated processor specialized for a specific process. The dedicated processor may be an application specific integrated circuit (ASIC). The processor may be a programmable logic device (PLD). The PLD may be a field-programmable gate array (FPGA). The controller 16 may be any of SoC (System on a Chip) and SiP (System in a Package) that cooperates with the at least one processor.

In an embodiment, the controller 16 has a normal mode and a calculation mode. In the normal mode, the controller 16 may detect, based on the input image data, an object in the image. In the normal mode, the controller 16 may calculate the distance to the detected object. In the calculation mode, the controller 16 calculates a calibration value for calibrating the input image signal. The controller 16 is not limited to operating in any particular one of a plurality of different modes. The controller 16 may detect the object or calculate the distance to the detected object while calculating the calibration value for calibrating the input image signal.

The output interface 17 is an output interface for outputting data from the calculation device 14. The input interface 15 may include a physical connector or a wireless communication device. In an embodiment, the output interface 17 is connected to a network of the vehicle 1 such as Control Area Network (CAN). The calculation device 14 is connected to a control device, a warning device, etc. of the vehicle 1 via the CAN. The calculation device 14 outputs information from the output interface 17 to the control device, the warning device, etc. The output information is appropriately used in each of the control device, the warning device, etc.

In an embodiment, the output interface 17 is separate from the input interface 15. This is, however, not a limitation. In an embodiment, the input interface 15 and the output interface 17 may be one communication interface. Such a communication interface serves as a communication interface of the camera device 10. The communication interface may include a physical connector or a wireless communication device.

The memory 18 stores calibration values. The calibration values include a first calibration value (first calibration data) and a second calibration value (second calibration data). The memory 18 includes rewritable memory. Examples of the memory 18 include non-volatile memory such as flash memory, magnetic memory (MRAM: Magnetoresistive Random Access Memory), and ferroelectric memory (FeRAM: Ferroelectric Random Access Memory).

The operations of the controller 16 according to an embodiment are described in more detail below. In an embodiment, the controller 16 includes a calibrator 19, a stereo calculation unit 20, and a calibration calculation unit 21. The operations of each of the components are described below. Each of the calibrator 19, the stereo calculation unit 20, and the calibration calculation unit 21 may be a hardware module or a software module. The operations that can be performed by each of the calibrator 19, the stereo calculation unit 20, and the calibration calculation unit 21 can be executed by the controller 16. The controller 16 is not limited to embodiments which include the calibrator 19, the stereo calculation unit 20, and the calibration calculation unit 21, and one or more of the calibrator 19, the stereo calculation unit 20, and the calibration calculation unit 21 may be omitted. In an embodiment, the controller 16 may execute the operations of all of the calibrator 19, the stereo calculation unit 20, and the calibration calculation unit 21. The operations performed by each of the calibrator 19, the stereo calculation unit 20, and the calibration calculation unit 21 may be interpreted as operations performed by the controller 16. A process performed by the controller 16 using any of the calibrator 19, the stereo calculation unit 20, and the calibration calculation unit 21 may be executed by the controller 16 itself.

The calibrator 19 calibrates the image with reference to the calibration values stored in the memory 18. The calibrator 19 calibrates the image received from each of the first camera 11 and the second camera 12. The calibrator 19 performs electronic calibration for a deviation of each of the first camera 11 and the second camera 12 from the standard, by data conversion of the image. The calibrator 19 converts the left image and the right image into parallel equipotential images.

The calibrator 19 refers to the first calibration value when calibrating each of the image data received from the first camera 11 and the second camera 12. The calibrator 19 refers to the second calibration value when calibrating the left image and the right image as a stereo image.

The stereo calculation unit 20 determines the parallax between the left image and the right image calibrated by the calibrator 19. The stereo calculation unit 20 divides one of the left image and the right image into a plurality of areas. The stereo calculation unit 20 performs matching between each of the plurality of areas of the divided image and the other image. Based on the difference in coordinate in the right-left direction between two matching areas of the left image and the right image, the stereo calculation unit 20 calculates the distance of the areas. The stereo calculation unit 20 generates a distance image indicating the distribution of the calculated distances. The stereo calculation unit 20 detects a part in which areas equal in distance concentrate, to identify an object at the position. The stereo calculation unit 20 determines the distance to the identified object, from the distance of the area where the object is identified. The object identified by the stereo calculation unit 20 is, for example, an obstacle. The obstacle includes at least one of a person, a vehicle, a road sign, a building, and a plant. In an embodiment, the stereo calculation unit 20 associates the identified object with the distance image. The stereo calculation unit 20 outputs information including at least one of the distance image, the identified object, and the distance to the object, via the output interface 17. In an embodiment, the stereo calculation unit 20 executes the process in real time. The stereo calculation unit 20 may recognize the road geometry based on the parallax image.

The calibration calculation unit 21 calculates the first calibration value for calibrating the image data received from each camera. The calibration calculation unit 21 calculates the first calibration value for calibrating the left image and the right image received respectively from the first camera 11 and the second camera 12. Based on the calibrated left image and right image, the calibration calculation unit 21 calculates the second calibration value used when calibrating the left image and the right image as a stereo image. The calibration calculation unit 21 updates the calibration values stored in the memory 18.

Figure 3:
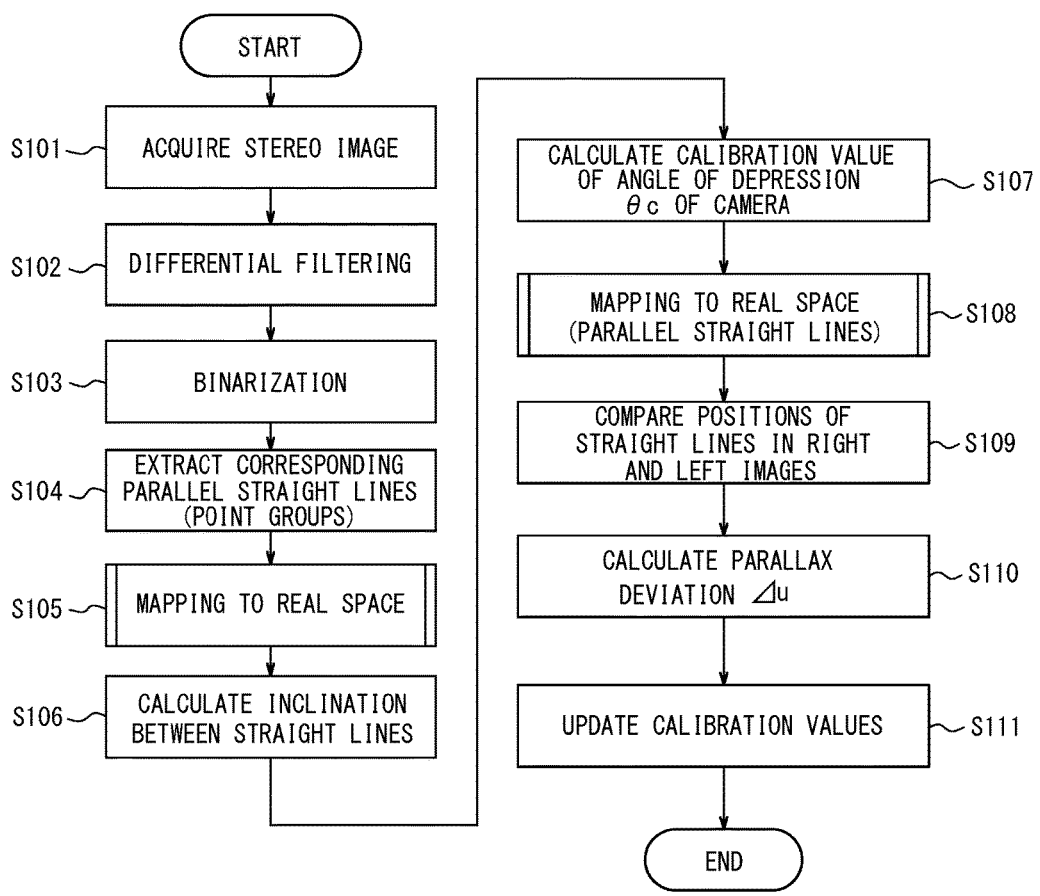
FIG. 3 is a flowchart illustrating a calibration value update procedure in a calibration calculation unit.

The processing by the calibration calculation unit 21 is described below, with reference to a flowchart in FIG. 3. The process illustrated in the flowchart of FIG. 3 may be interpreted as being executed by the controller 16.

First, the calibration calculation unit 21 acquires the left image by means of the first camera 11 and the right image by means of the second camera 12, which have been calibrated using the current calibration values, from the calibrator 19 (step S101). The calibration calculation unit 21 then performs differential filtering on each of the acquired left image and right image (step S102). The differential filtering enhances parts having large changes in luminance value in each image. With such enhancement of the parts having large changes in luminance value, edges of a subject in each image are enhanced. The calibration calculation unit 21 further performs binarization on each image that has undergone the differential filtering (step S103). The binarization sharpens the edges in each image. The calibration calculation unit 21 extracts the edges from each image in which the edges have been sharpened.

Following this, the calibration calculation unit 21 extracts, in each of the edge-sharpened left image and right image, a plurality of points from lines in the image corresponding to a plurality of straight lines parallel to each other in the subject in the real space (step S104). The calibration calculation unit 21 extracts, in each of the left image and the right image, points from lines corresponding to the same straight lines in the real space. The number of points extracted by the calibration calculation unit 21 is two or more. In some embodiments, the calibration calculation unit 21 extracts 100 points. The plurality of points extracted by the calibration calculation unit 21 is hereafter also referred to as a "point group". By extracting a point group, the calibration calculation unit 21 substantially extracts a line that includes the point group. The extraction by the calibration calculation unit 21 is not limited to points, and the calibration calculation unit 21 may extract lines. In the case of a vehicle running on a road, the calibration calculation unit 21 extracts a point group corresponding to each of mutual parallel lines such as division lines, e.g. white lines, on the road surface, boundary lines between the road and a sidewalk, and boundary lines between the road and a median strip. In the case of a vehicle running on tracks, the calibration calculation unit 21 extracts a point group corresponding to each of the parallel tracks. In the present disclosure, the term "three-dimensional coordinate space" refers to a three-dimensional virtual space based on images captured by the cameras.

Figure 4:
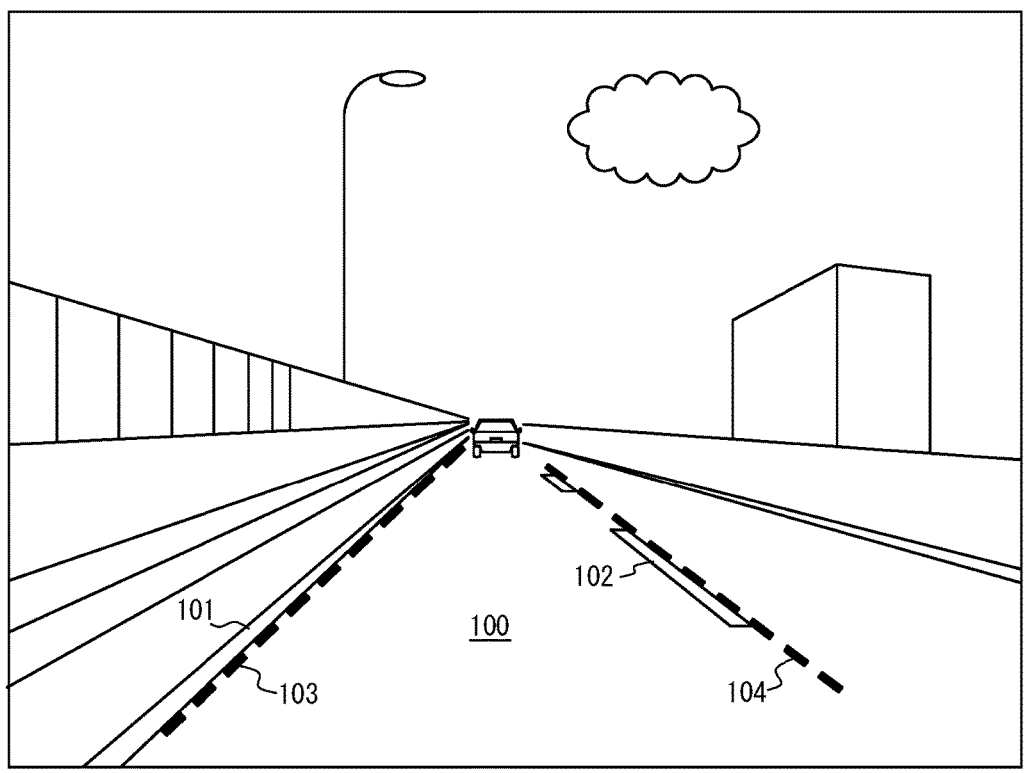
FIG. 4 is a diagram illustrating an example of extracting parallel straight lines in a real space from a camera image.
Figure 5:
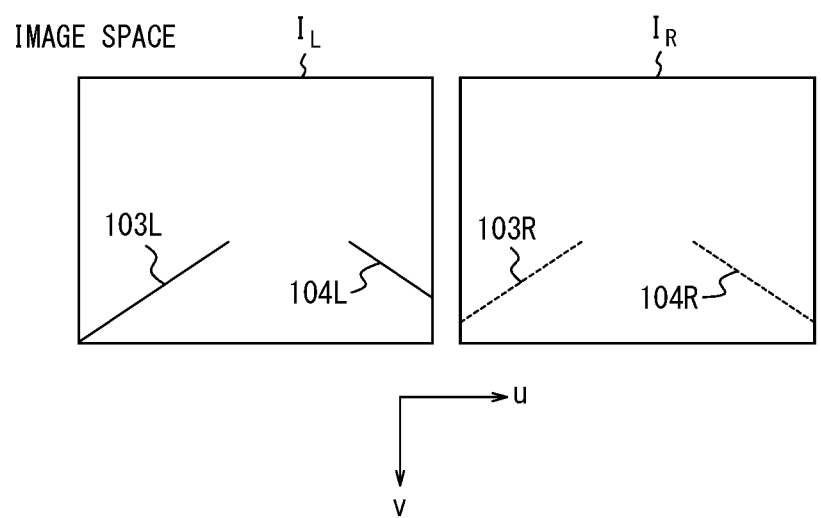
FIG. 5 is a conceptual diagram illustrating a pair of straight lines that are extracted from a left image and a right image and correspond to a pair of parallel straight lines included in a subject.

In FIG. 4, the straight lines parallel to each other can be extracted from straight lines on the same plane. The same plane may be the road surface (XZ plane) that is the ground on which the vehicle 1 is running. The real road surface 100 has a section in which a white line 101 between a driving lane and a side strip and a white line 102 between driving lanes are marked. For example, the calibration calculation unit 21 extracts points from straight lines 103 and 104 that are respectively the right edges of the white lines 101 and 102. In FIG. 5 and the below-mentioned FIGS. 11, 12, and 13, each point group extracted from a left image and its mapping line are indicated by solid lines, and each point group extracted from a right image and its mapping line are indicated by dashed lines, for the purpose of illustration. Although the white lines 101 and 102 linearly extend into the distance in front of the vehicle 1 in this example, the white lines may each have at least a straight section in part. The calibration calculation unit 21 may extract a point group from a straight part of each white line that includes a bent section due to a curve of the road. The calibration calculation unit 21 then performs further processing.

In a conceptual diagram in FIG. 5, the point groups extracted from the left image and the right image are indicated respectively by solid lines and dashed lines. These solid lines and dashed lines correspond to, for example, the pair of straight lines parallel to each other in the real space as the subject. Linear point groups extracted from a left image $I_L$ in correspondence with the straight lines 103 and 104 are denoted by 103L and 104L, and linear point groups extracted from a right image $I_R$ in correspondence with the straight lines 103 and 104 are denoted by 103R and 104R. Here, the origin point (0, 0) of each image is at the top left corner, and the rightward direction in the image is the u direction, and the downward direction in the image is the v direction. The coordinates (u, v) are expressed as a pixel value from the origin point (0, 0). Such a two-dimensional coordinate space is hereafter referred to as "image space". Each of the pair of point groups 103L and 104L in the left image $I_L$ and the pair of point groups 103R and 104R in the right image $I_R$ increases in their spacing in the u direction as the coordinate value in the v direction increases.

Figure 6:
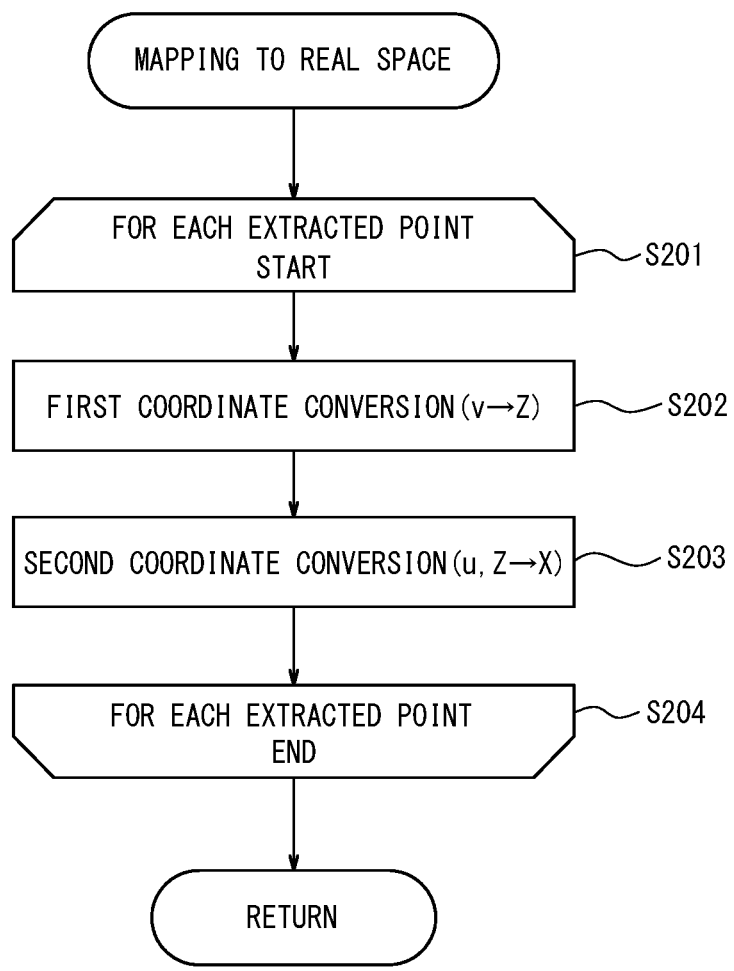
FIG. 6 is a flowchart illustrating a procedure of mapping straight lines in an image space to a three-dimensional coordinate space.

The calibration calculation unit 21 maps the point groups 103L and 104L and the point groups 103R and 104R, which are linear in two-dimensional coordinates in the respective image spaces of the left image $I_L$ and the right image $I_R$, to a three-dimensional coordinate space (step S105). FIG. 6 is a flowchart illustrating a procedure of mapping a point group in the image space to the three-dimensional coordinate space. Here, "mapping" means associating each element such as a point and a line in the two-dimensional image space with coordinates in the real space by coordinate conversion into the three-dimensional coordinate space. The calibration calculation unit 21 coordinate-converts the extracted point groups of the left image $I_L$ and the right image $I_R$ into a (X, Y, Z) coordinate system identical to the real space, using the current calibration values. In the real space, for example, the Y coordinate of the road surface is set to 0. In this example, the Y coordinates of the white lines 101 and 102 on the road surface 100 are 0.

The calibration calculation unit 21 performs the following procedure for each extracted point of the point groups 103L and 104L of the left image $I_L$ and each extracted point of the point groups 103R and 104R of the right image $I_R$ (step S201). Although only the coordinate conversion for the left image in steps S202 and S203 is described below, the same process is performed on the right image.

Figure 7:
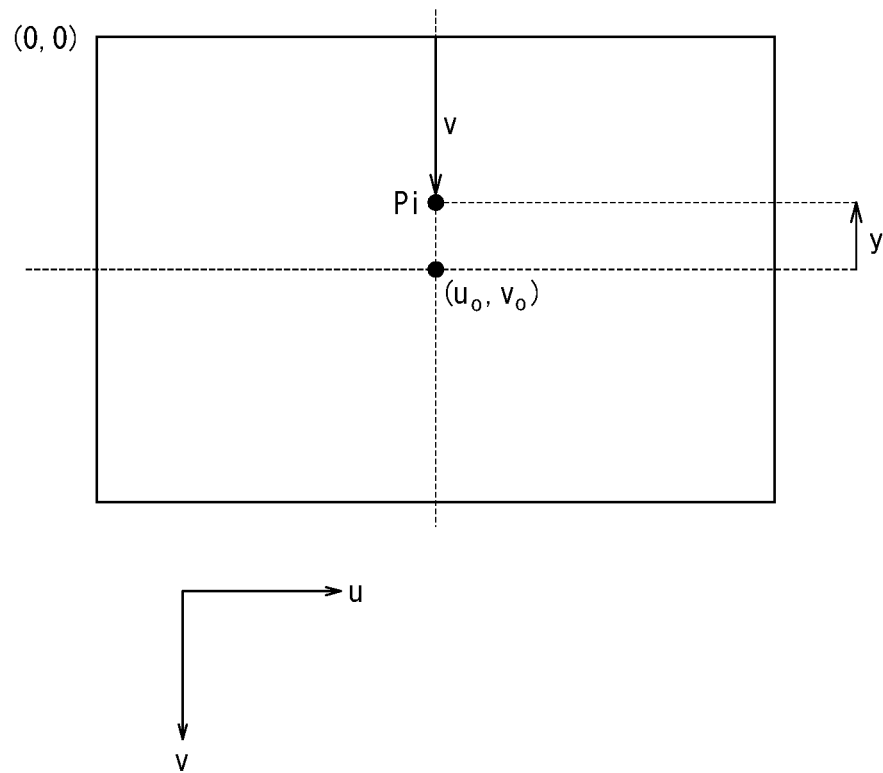
FIG. 7 is a diagram illustrating the relationship between a pixel value in the v direction and an image height y in a camera image.

As the first coordinate conversion, the calibration calculation unit 21 converts the v coordinate of an extracted point Pi into the Z coordinate in the three-dimensional coordinate space (step S202). The principle is as follows. In FIG. 7, ($u_0$, $v_0$) is a point on the optical axis of the first camera 11, and represents the center of the image space. From the coordinate value v (pixel value) of the extracted point in the v direction in the image space, the image height y (mm: millimeter) of the extracted point in the image space is obtained according to the following expression:

$$y = (v - v_0) \cdot p \quad (1)$$

where p is the pixel pitch of the first camera 11 corresponding to the extracted point.

Figure 8:
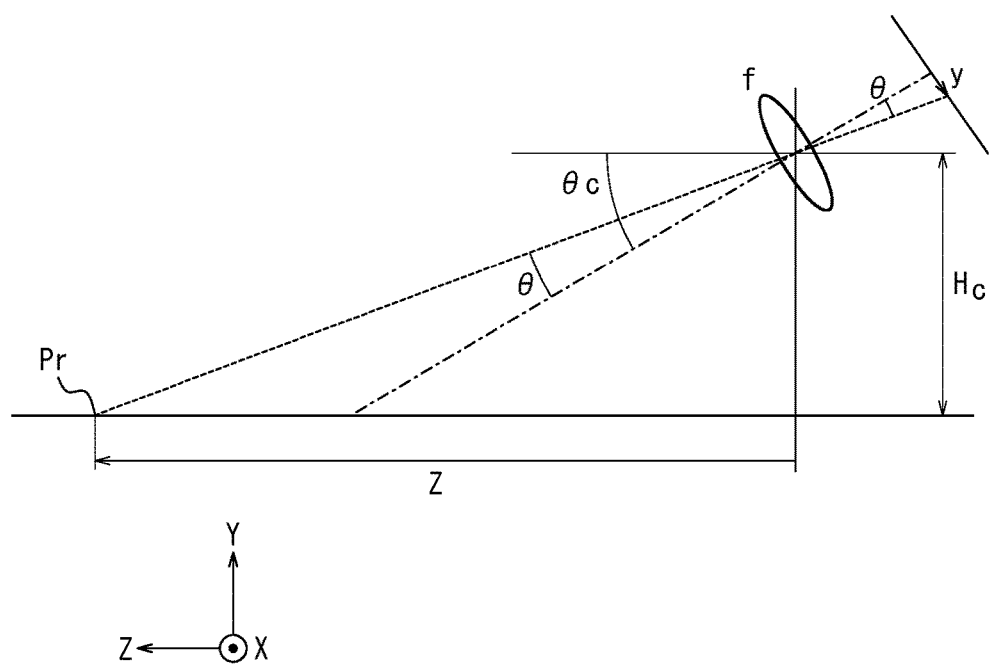
FIG. 8 is a diagram illustrating the correspondence between the image height y in the image space and a coordinate in the Z direction in the three-dimensional coordinate space.

The image height y in the image space is then converted into an angle of incidence θ in the YZ plane when light from the extracted point enters the first camera 11. As illustrated in FIG. 8, in the case of calibration based on a pinhole model, the distance from the center of the lens of the first camera 11 to the light receiving surface is adjusted to the focal length f of the lens. The angle of incidence θ is accordingly given by the following expression:

$$\theta = \tan^{-1}\left(\frac{y}{f}\right) \quad (2)$$

Moreover, when $H_C$ is the height of the first camera 11 from the road surface, the relational expression of the following Expression (3) holds for the geometric relationship illustrated in FIG. 8:

$$Z = \frac{H_C}{\tan(\theta_C - \theta)} \quad (3)$$

Here, the angle of depression (i.e. the angle between the optical axis of the camera and the road surface (XZ plane), in the downward direction with respect to the horizontal direction) $\theta_C$ of the optical axis of the camera which is the installation angle of the camera is the angle between the plane (i.e. the road surface 100) including the extracted parallel straight lines 103 and 104 and the optical axis of the corresponding first camera 11 in the real space. The first camera 11 and the second camera 12 are calibrated with high accuracy using a chart pattern and the like before factory shipment. As the value of the angle of depression $\theta_C$, a calibration value before factory shipment or a calibration value updated by the previous calculation mode process is stored in the memory 18.

Consolidating Expressions (1), (2), and (3) yields the following conversion expression from the v coordinate in the image space to the Z coordinate in the three-dimensional coordinate space:

$$Z = H_C \cdot \frac{f - (v - v_0)p \cdot \tan\theta_C}{f \cdot \tan\theta_C - (v - v_0)p} \qquad (4)$$

The calibration calculation unit 21 converts the v coordinate of the extracted point Pi into the Z coordinate in the three-dimensional coordinate space according to Expression (4), in step S202.

Figure 9:
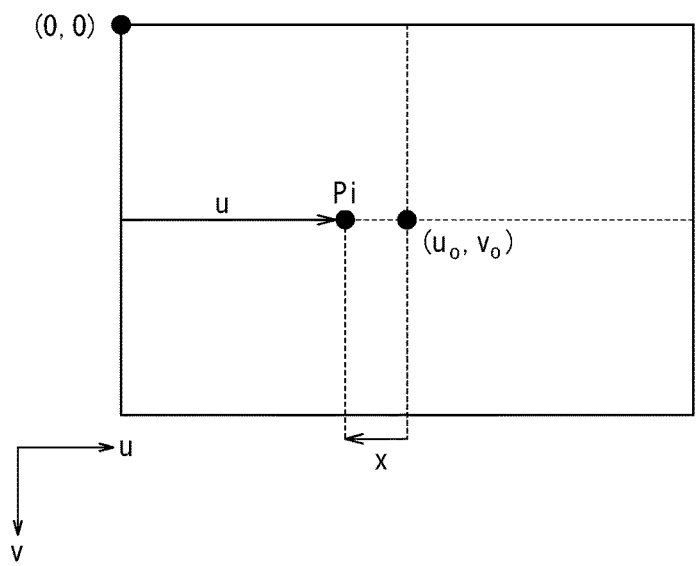
FIG. 9 is a diagram illustrating the relationship between a pixel value in the u direction and an image height x in a camera image.

Returning to the flowchart in FIG. 6, as the second coordinate conversion, the calibration calculation unit 21 converts the u coordinate of the extracted point and the Z coordinate in the three-dimensional coordinate space into the X coordinate in the three-dimensional coordinate space (step S203). The principle is as follows. In FIG. 9, $(u_0, v_0)$ represents the center of the image space, and is a point on the optical axis of the corresponding first camera 11. From the coordinate value u (pixel value) of the extracted point Pi in the image space, the image height x (mm) of the extracted point in the u direction in the image space is obtained according to the following expression:

$$x = (u - u_0) \cdot p \qquad (5)$$

The image height x in the image space is converted into the angle of incidence $\phi$ in the XZ plane when light from the extracted point Pi enters the first camera 11. In the case of calibration based on a pinhole model, the angle of incidence $\phi$ is given by the following expression:

$$\phi = \tan^{-1}\left(\frac{x}{f}\right) \qquad (6)$$

Figure 10:
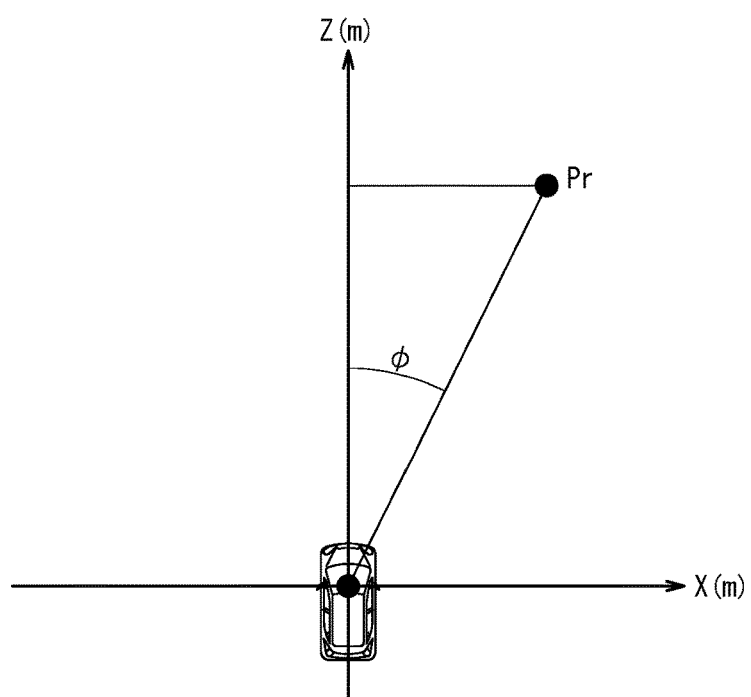
FIG. 10 is a diagram illustrating the relationship between an X coordinate position of a subject in the three-dimensional coordinate space and an angle of incidence $\phi$ to a camera.

From FIG. 10, the coordinate Z in the three-dimensional coordinate space and the angle of incidence $\phi$ have the following geometric relationship with the coordinate X in the three-dimensional coordinate space:

$$X = Z \cdot \tan\phi \qquad (7)$$

Consolidating Expressions (5), (6), and (7) yields the following conversion expression from the u coordinate in the image space and the Z coordinate in the three-dimensional coordinate space to the X coordinate in the three-dimensional coordinate space:

$$X = Z \cdot \frac{(u - u_0) \cdot p}{f} \qquad (8)$$

The calibration calculation unit 21 converts the u coordinate of the extracted point and the Z coordinate in the three-dimensional coordinate space into the X coordinate in the three-dimensional coordinate space according to Expression (8), in step S203.

Thus, the calibration calculation unit 21 can map the point (u, v) in the image space to the point (X, 0, Z) in the three-dimensional coordinate space using Expressions (4) and (8).

The calibration calculation unit 21 performs steps S202 and S203 for all extracted points of the left image and the right image (steps S201 and S204). When mapping is completed for all extracted points, processing according to the flowchart of FIG. 6 is ended, and processing returns to the flowchart of FIG. 3.

According to this mapping to the three-dimensional coordinate space, the calibration calculation unit 21 performs calibration for a positional deviation of the same object in the image space due to the difference in position in the right-left direction between the first camera 11 and the second camera 12. As a result of mapping from the image space to the three-dimensional coordinate space, the same straight line included in the respective images captured by the first camera 11 and the second camera 12 is ideally mapped at the same position.

Calibration in the case of a deviation in the angle of depression Oc of each of the first camera 11 and the second camera 12 with respect to the right-left direction, and a deviation in the relative position of the image sensor of the camera and the optical axis of the lens, is described below.

Figure 11:
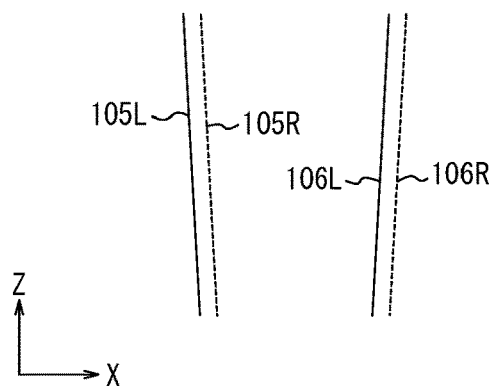
FIG. 11 is a conceptual diagram illustrating straight lines extracted from a left image and a right image and mapped to the three-dimensional coordinate space.

FIG. 11 is a conceptual diagram illustrating approximate straight lines 105L, 105R, 106L, and 106R calculated from the plurality of mapping points obtained by respectively mapping the point groups 103L, 103R, 104L, and 104R, which have been extracted from the left image $I_L$ and the right image $I_R$, to the three-dimensional coordinate space. The approximate curves 105L, 105R, 106L, and 106R are mapping lines obtained by mapping, to the three-dimensional coordinate space, the lines in the image space extracted as the point groups 103L, 103R, 104L, and 104R respectively. The calibration calculation unit 21 determines each of the approximate straight lines 105L, 105R, 106L, and 106R where a plurality of mapping points concentrates, using the method of least squares or the like. In FIG. 11, the deviation between the straight lines and the inclination are exaggerated for the purpose of illustration.

The pair of approximate straight lines 105L and 106L and the pair of approximate straight lines 105R and 106R, which correspond to the straight lines 103 and 104 that are respectively the edges of the parallel white lines 101 and 102 on the road surface 100, are each not parallel to each other. Moreover, the pair of approximate straight lines 105L and 105R corresponding to the same straight line do not overlap each other, and the pair of approximate straight lines 106L and 106R corresponding to the same straight line do not overlap each other. This lack of parallelism and overlap is attributable to a new deviation from the calibrated state for the calibration values stored in the memory 18, which means that calibration using the calibration values stored in the memory 18 is not possible.

The calibration calculation unit 21 accordingly calculates new calibration values by making adjustment so that each of the pair of approximate straight lines 105L and 106L and the pair of approximate straight lines 105R and 106R mapped in the three-dimensional coordinate space are parallel to each other and each of the pair of approximate straight lines 105L and 105R and the pair of approximate straight lines 106L and 106R mapped in the three-dimensional coordinate space overlap each other. The calibration calculation unit 21 updates the calibration values with the calculated new calibration values.

First, the calibration calculation unit 21 calculates the inclination of the approximate straight lines 105L and 106L (step S106). The calibration calculation unit 21 similarly calculates the inclination of the approximate straight lines 105R and 106R (step S106).

Next, the calibration calculation unit 21 adjusts, from Expressions (4) and (8), the angle of depression of the camera optical axis, which is a variational parameter of the first camera 11, so that the approximate straight lines 105L and 106L are parallel to each other, to determine its calibration value $\theta_{CL}$ (step S107). In an embodiment, the calibration calculation unit 21 adjusts the angle of depression so that the approximate straight lines 105L and 106L are parallel to the Z axis, to determine the calibration value $\theta_{CL}$. The calibration calculation unit 21 equally determines the calibration value $\theta_{CR}$ of the angle of depression of the camera optical axis for the second camera 12 (step S107). Here, a predetermined mounting angle of depression of each of the first camera 11 and the second camera 12 set before factory shipment may be stored as a reference value of the angle of depression of the camera optical axis in the memory 18, as a factory-configured calibration value. The calibration calculation unit 21 can then adjust the angle of depression of the camera optical axis based on the reference value, to determine each of the calibration values $\theta_{CL}$ and $\theta_{CR}$. The calibration values $\theta_{CL}$ and $\theta_{CR}$ of the angle of depression are each the first calibration value that is referred to when calibrating the image data received from the corresponding one of the first camera 11 and the second camera 12.

After determining the calibration values $\theta_{CL}$ and $\theta_{CR}$ of the angles of depression of the respective optical axes of the first camera 11 and the second camera 12, the calibration calculation unit 21 maps the point groups extracted from the left image $I_L$ and the right image $I_R$ to the three-dimensional coordinate space using the new calibration values $\theta_{CL}$ and $\theta_{CR}$ (step S108). The mapping to the three-dimensional coordinate space is performed as illustrated in the flowchart in FIG. 6, as in step S105.

Figure 12:
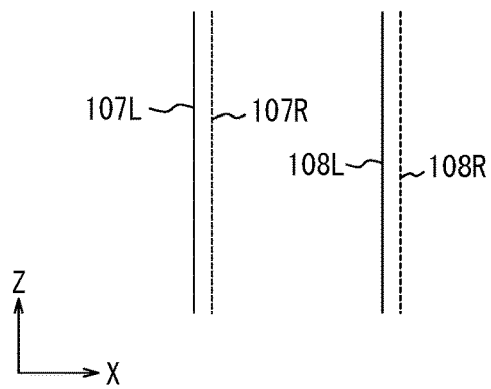
FIG. 12 is a conceptual diagram illustrating parallel straight lines mapped to the three-dimensional coordinate space after calibration of the angle of depression of an optical axis of a camera.

In FIG. 12, approximate curves 107L, 107R, 108L, and 108R are mapping lines obtained by mapping, to the three-dimensional coordinate space, the lines in the image space extracted respectively as the point groups 103L, 103R, 104L, and 104R. The approximate straight lines 107L and 108L respectively corresponding to the straight lines 103 and 104 that are the edges of the parallel white lines 101 and 102 of the subject are parallel to each other. Likewise, the approximate straight lines 107R and 108R are parallel to each other. Meanwhile, the approximate straight lines 107L and 107R corresponding to the straight line 103 that is the edge of the white line 101, i.e. the same straight line of the subject, are mapped in parallel to each other and with a deviation from each other in the X direction. The approximate straight lines 108L and 108R corresponding to the straight line 104 that is the edge of the white line 102, i.e. the other same straight line of the subject, are mapped in parallel to each other and with a deviation from each other in the X direction.

Next, according to step S108, the calibration calculation unit 21 compares the positions of the approximate straight lines 107L and 108L mapped from the left image to the three-dimensional coordinate space and the approximate straight lines 108R and 108R mapped from the right image to the three-dimensional coordinate space (step S109).

The calibration calculation unit 21 further calculates a parallax deviation $\Delta u$ (calibration data) so that the pair of mapped approximate straight lines 107L and 107R match each other and the pair of mapped approximate straight lines 108L and 108R match each other (step S110). The parallax deviation $\Delta u$ is the second calibration value that is referred to when calibrating the image data received from the first camera 11 and the second camera 12 as a stereo image. The parallax deviation $\Delta u$ is the difference of positional deviation between the first camera 11 and the second camera 12 occurring with time. By relatively shifting the u coordinate in the image space of the left image and the right image by the pixel amount corresponding to the parallax deviation $\Delta u$, the parallax deviation between the left image and the right image can be eliminated.

Figure 13:
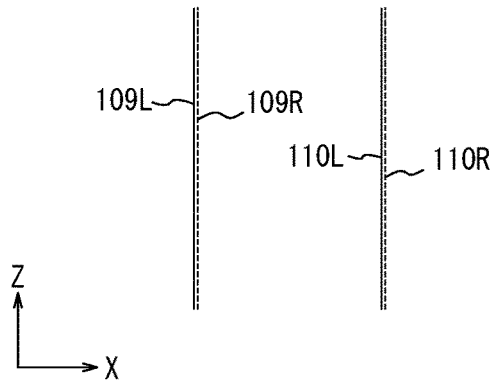
FIG. 13 is a conceptual diagram illustrating parallel straight lines mapped to the three-dimensional coordinate space after calibration of parallax deviation Δu.

In FIG. 13, approximate curves 109L, 109R, 110L, and 110R are mapping lines obtained by mapping, to the three-dimensional coordinate space, the lines in the image space extracted respectively as the point groups 103L, 103R, 104L, and 104R. The approximate straight lines 109L and 109R corresponding to the straight line 103 that is the edge of the same white line 101 of the subject match each other. The approximate straight lines 110L and 110R corresponding to the straight line 104 that is the edge of the same white line 102 of the subject match each other.

Lastly, the calibration calculation unit 21 updates the calibration values by storing, in the memory 18, the updated calibration values $\theta_{CL}$ and $\theta_{CR}$ of the angles of depression of the optical axes of the first camera 11 and the second camera 12 and calibration value $\Delta u$ of the parallax deviation between the left image and the right image (step S111). The calibration calculation unit 21 then ends the calibration value update process. The respective coordinates $u_0$ on the optical axis of the left image and the right image may be relatively shifted according to the parallax deviation $\Delta u$ as $u_{0L}$ and $u_{0R}$ and stored as calibration values, instead of the calibration value $\Delta u$ of the parallax deviation.

After the calibration values in the memory 18 are updated, the calibrator 19 calibrates the left image from the first camera 11 and the right image from the second camera 12 (stereo image) using the updated calibration values $\theta_{CL}$, $\theta_{CR}$, and $\Delta u$, and outputs the calibrated left image and right image to the stereo calculation unit 20, until the next calibration value update process. The controller 16 may cause the calibration calculation unit 21 to automatically perform a calibration value update at regular time intervals or upon at least one of startup and shutdown of the calculation device 14. The controller 16 may initiate a calibration value update based on manual operation or a signal received from another device.

As described above, with the camera device 10 according to this embodiment, calibration can be performed without calculating a vanishing point of parallel straight lines. The camera device 10 converts lines in the image space obtained by capturing parallel straight lines of a subject, so as to be parallel straight lines in the three-dimensional coordinate space. Here, by correcting the angle of depression $\theta_C$ of the optical axis of each of the first camera 11 and the second camera 12, the calibration is performed while taking the inclination of the road surface into account. Hence, even in the case where the vehicle is running on an inclined road surface such as a slope, favorable calibration can be achieved without a decrease in calibration accuracy.

In an embodiment, the camera device 10 can perform calibration in an operating environment. In an embodiment, the camera device 10 can perform calibration by digital processing. In an embodiment, the camera device 10 can reduce the load on the user. In an embodiment, the camera device 10 can easily maintain accuracy as the calibration values can be updated in an operating environment.

The camera device 10 calculates the parallax deviation $\Delta u$ (calibration data), and performs calibration for the difference of the relative positional deviation of the image sensor and the lens optical axis between the two cameras. The positional deviation of the image sensor and the lens optical axis, even when a small amount, causes a significant error in distance measurement. The camera device 10 is capable of updating the calibration values by simple calculation, so that distance measurement accuracy can be maintained easily.

Figure 14:
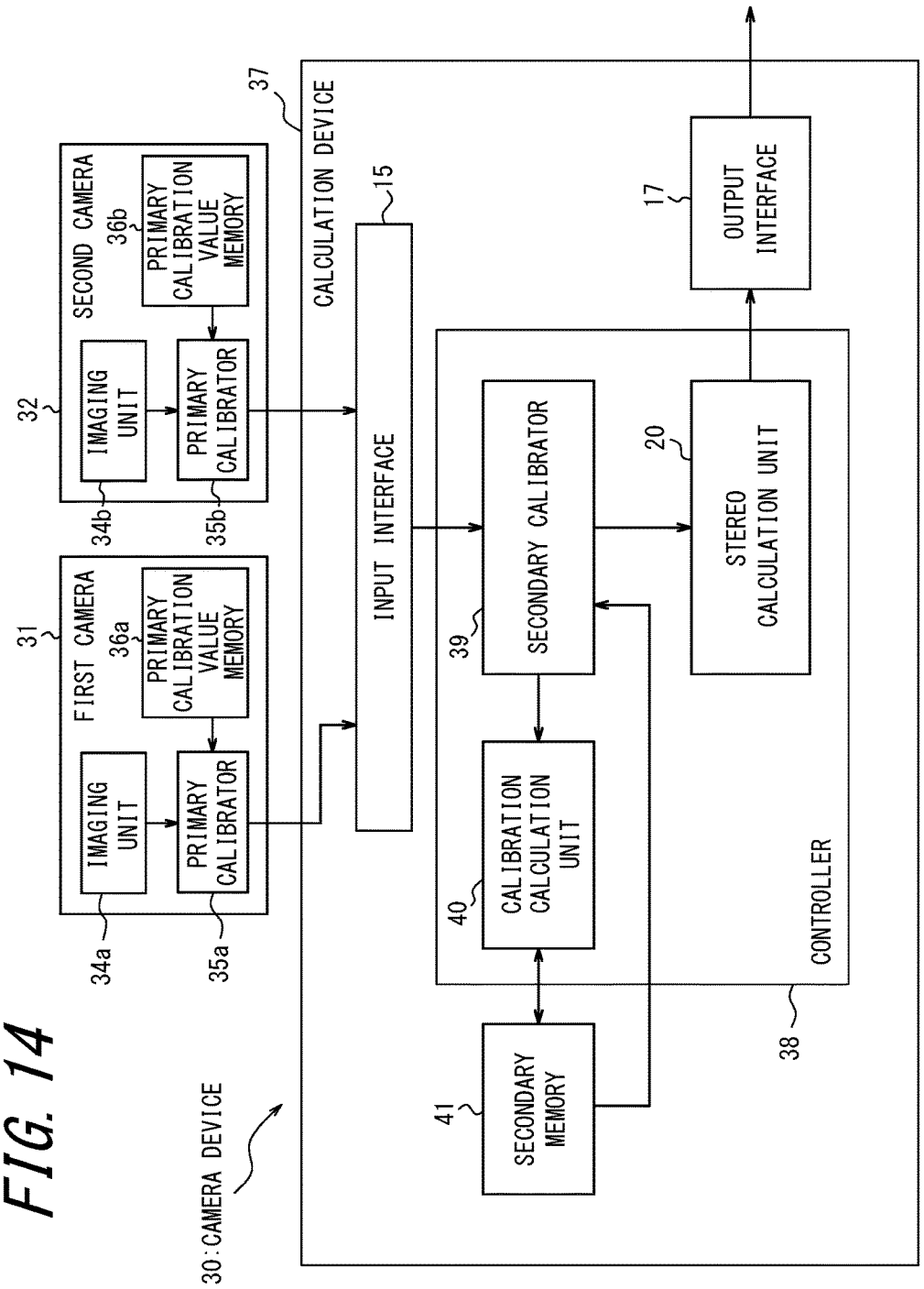
FIG. 14 is a block diagram illustrating a schematic configuration of a camera device according to an embodiment.

A camera device 30 in FIG. 14 according to an embodiment includes a first camera 31, a second camera 32, and a calculation device 37.

The first camera 31 and the second camera 32 respectively include imaging units 34a and 34b, primary calibrators 35a and 35b, and primary calibration value memories 36a and 36b. The first camera 31 and the second camera 32 are accurately calibrated using a chart pattern or the like before factory shipment as an example, and their calibration values are stored in the primary calibration value memories 36a and 36b as primary calibration values. The primary calibration values may be the same calibration values as in the embodiment illustrated in FIGS. 1 to 13. The primary calibrators 35a and 35b respectively calibrate the images captured by the imaging units 34a and 34b based on the primary calibration values in the primary calibration value memories 36a and 36b, and transmit them to the input interface 15 of the calculation device 37. The primary calibration values are basically fixed values, and are not updated.

The calculation device 37 includes an input interface 15, a controller 38, a secondary memory 41, and an output interface 17. The controller 38 includes a secondary calibrator 39 and a calibration calculation unit 40, instead of the calibrator 19 and the calibration calculation unit 21 in the embodiment illustrated in FIG. 2. The other components are the same as those in the embodiment illustrated in FIG. 2. In the calculation mode, the secondary calibrator 39 performs secondary calibration on the images received from the first camera 31 and the second camera 32. The secondary calibration is to correct any deviation caused by temporal change, vibratory collision, and the like after factory shipment, for each image after the primary calibration. The calibration calculation unit 40 performs the same calibration value update process as in the embodiment illustrated in FIGS. 1 to 13, on the primary-calibrated left image and right image. Thus, calibration values for additional calibration stored in the secondary memory 41 can be updated as secondary calibration values.

According to this embodiment, favorable calibration can be achieved as in the embodiment illustrated in FIGS. 1 to 13. Moreover, the camera device 30 according to this embodiment also eliminates the need to calculate a vanishing point.

Figure 15:
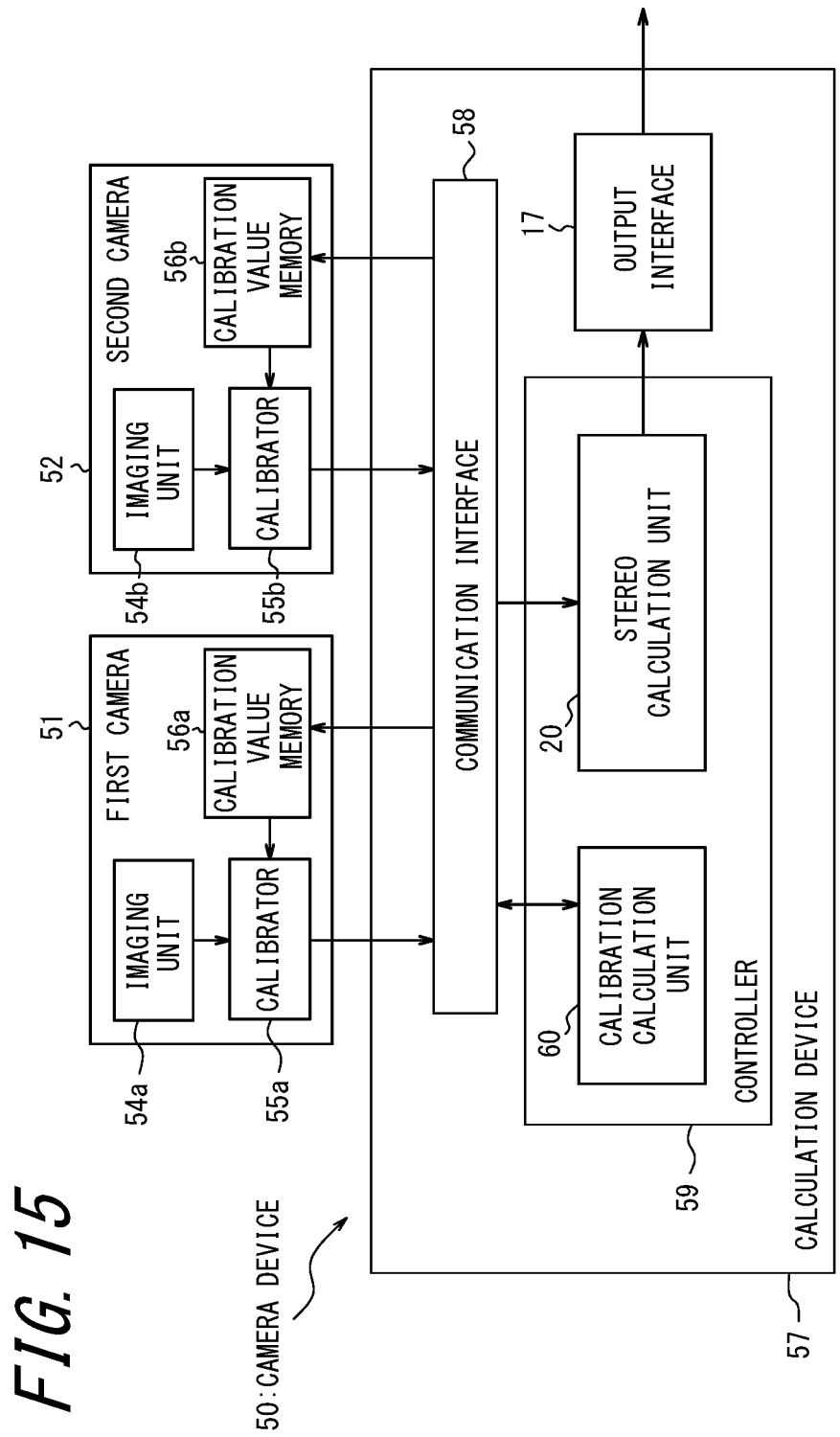
FIG. 15 is a block diagram illustrating a schematic configuration of a camera device according to an embodiment.

A camera device 50 in FIG. 15 according to an embodiment includes a first camera 51, a second camera 52, and a calculation device 57.

The first camera 51 and the second camera 52 are similar to the first camera 31 and the second camera 32 in the embodiment illustrated in FIG. 14, and respectively include imaging units 54a and 54b, calibrators 55a and 55b, and calibration value memories 56a and 56b. The calibration value memories 56a and 56b are rewritable according to a signal from the calculation device 57, unlike the primary calibration value memories 36a and 36b in the embodiment illustrated in FIG. 14.

The calculation device 57 includes a communication interface 58, a controller 59, and an output interface 17. The communication interface 58 is capable of receiving image signals from the first camera 51 and the second camera 52 like the input interface 15 in the embodiment illustrated in FIGS. 1 to 13, and also outputting a rewrite signal to the calibration value memories 56a and 56b in the first camera 51 and the second camera 52. The controller 59 includes a calibration calculation unit 60 and a stereo calculation unit 20. The output interface 17 and the stereo calculation unit 20 operate in the same way as the output interface 17 and the stereo calculation unit 20 in the embodiment illustrated in FIGS. 1 to 13.

In the calculation mode, the calibration calculation unit 60 can calculate the calibration values from the left image and the right image, in the same way as the calibration calculation unit 21 in the embodiment illustrated in FIG. 2. The calibration values calculated by the calibration calculation unit 60 are transmitted to the calibration value memories 56a and 56b in the first camera 51 and the second camera 52 via the communication interface 58, to update the calibration values.

In the normal mode, on the other hand, the first camera 51 and the second camera 52 transmit calibrated images to the calculation device 57. In the calculation device 57, the stereo calculation unit 20 performs processes such as detection of a measurement object in each image and distance calculation, and outputs the results.

According to this embodiment, the same advantageous effects as in the embodiment illustrated in FIGS. 1 to 13 can be achieved. Moreover, image calibration can be performed on the camera side.

In each of the foregoing embodiments, the camera device detects parallel lines such as white lines on a road surface, to perform calibration. This calibration method cannot be used in the case where there are no parallel objects. Right and left white lines on a road surface are not parallel depending on a change in gradient as in a slope, a road curve, and the like. This calibration method is not usable in such situations. A camera device according to an embodiment may project two or more parallel straight lines on a road surface during running, and perform calibration based on the projected straight lines.

Figure 16:
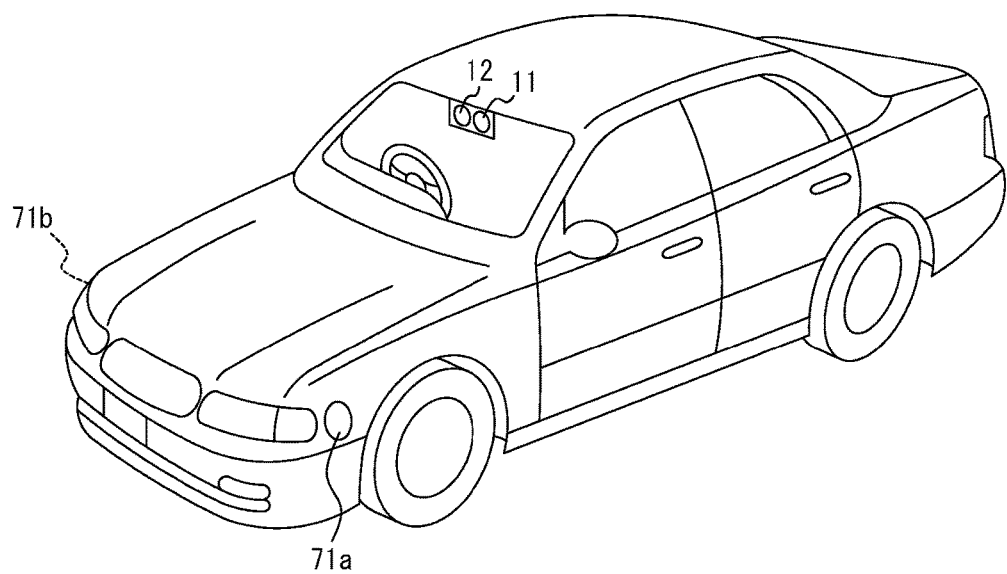
FIG. 16 is a simplified diagram illustrating the exterior of a vehicle equipped with a camera device according to an embodiment.
Figure 17:
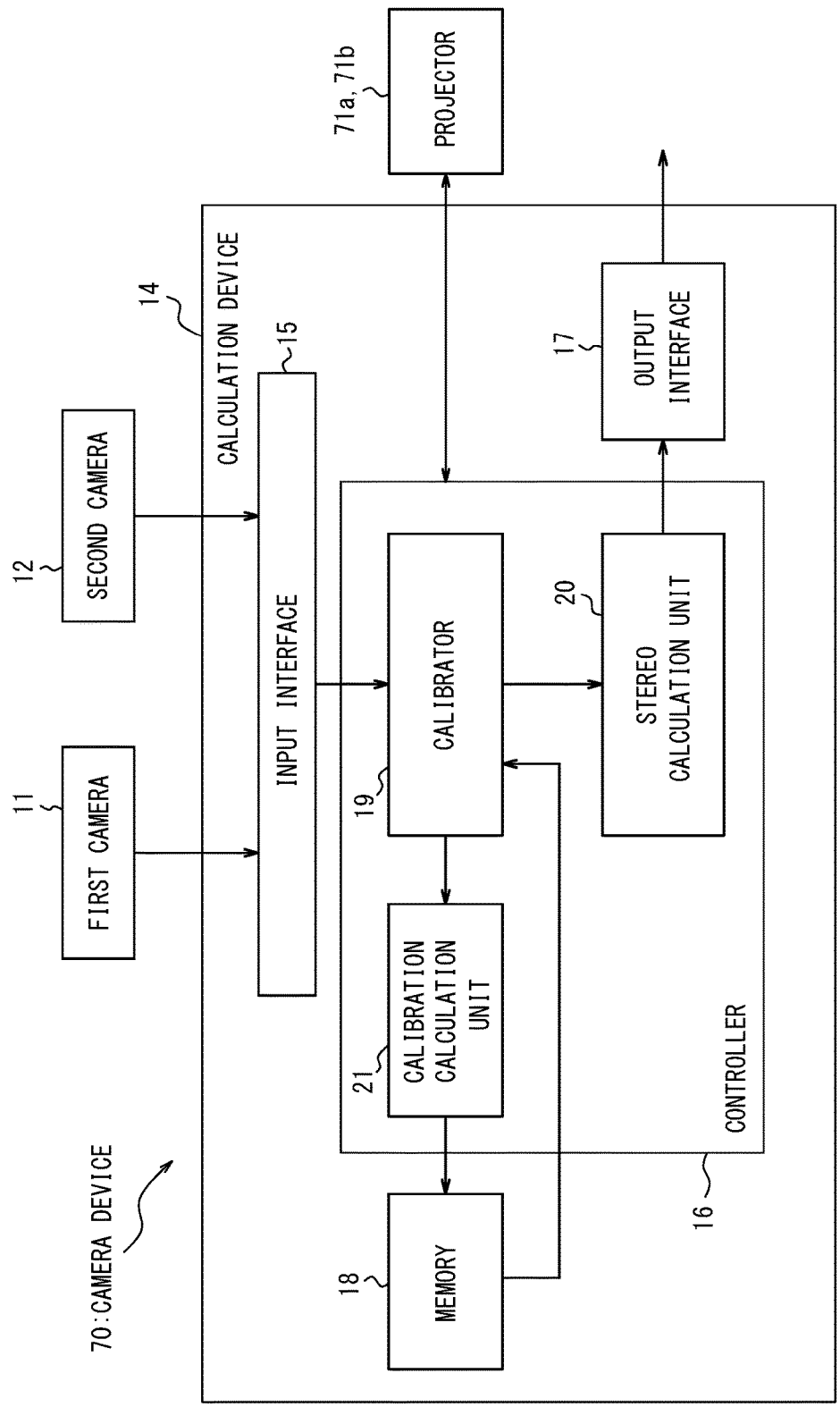
FIG. 17 is a block diagram illustrating a schematic configuration of a camera device according to an embodiment.

A camera device 70 according to an embodiment is described below, with reference to FIGS. 16 and 17. As illustrated in FIG. 17, the camera device 70 includes projectors 71a and 71b. The projectors 71a and 71b are devices for projecting parallel straight lines on the road surface. For example, the projectors 71a and 71b are provided near the left and right headlights of the front bumper of the vehicle as illustrated in FIG. 16, and emit light beams, which are wide in the up-down direction and narrow in the right-left direction, in a forward direction while the vehicle is running. By irradiating the road surface with the light beams, two parallel straight lines are projected on the road surface. The projection by the projectors 71a and 71b is not limited to two parallel lines, and the projectors 71a and 71b may project another specific pattern which includes parallel lines. Light emitted from the projectors 71a and 71b may be any of visible light such as white light, infrared light, and ultraviolet light. The camera device 70 captures the two parallel lines projected on the road surface, by the first camera 11 and the second camera 12. The projectors 71a and 71b need not be two separate devices, and may be one projector. For example, a projector may project two or more parallel lines on the road surface from the center of the front bumper of the vehicle. The position of the projector is not limited to the bumper of the vehicle. The projector may be fixed to any of the vehicle interior, the fender grille, the side fender, the light module, and the hood.

As illustrated in a block diagram in FIG. 17, the camera device 70 has the same configuration as the stereo camera device 10 illustrated in FIG. 2, except for the projectors 71a and 71b. The components same as or corresponding to those in the stereo camera device 10 are given the same reference signs as in FIG. 2. The projectors 71a and 71b operate in conjunction with the controller 16 in the calculation device 14, and project two parallel straight lines on the road surface in the calculation mode. For example, in the calculation mode, the controller 16 instructs the projectors 71a and 71b to project the two parallel lines. After the first camera 11 and the second camera 12 capture the two parallel straight lines projected on the road surface by the projectors 71a and 71b, the calibration calculation unit 21 calculates calibration values and updates them according to the same procedure as that in the flowchart in FIG. 3.

The camera device 70 can thus perform calibration for a deviation occurring in the position and direction of the stereo camera with time. The camera device 70 can calibrate the stereo camera at any timing. Even when there are remains of construction, a shadow of a building, or the like on the road surface, the camera device 70 has high calibration accuracy with a lower likelihood of false recognition.

The present disclosure is not limited to the embodiments described above, and various modifications and changes are possible. For example, the number of cameras included in the camera device is not limited to two, and may be three or more. The processes and the division of functions of the first and second cameras and the calculation device in each embodiment are an example, and the processes and the division of functions may be modified. For example, although the calibration value update is performed without exception after the step of mapping to the three-dimensional coordinate space (step S105) in the flowchart in FIG. 3, the calibration value update may be determined as unnecessary and the process from step S106 may be omitted if the straight lines captured by the first and second cameras are approximately parallel to each other and approximately match each other as a result of being mapped to the three-dimensional coordinate space. The distance measurement and object recognition method by the stereo calculation unit are not limited to the above, and various methods are applicable. Moreover, the present disclosure is not limited to use in vehicles such as motor vehicles, and may be used in, for example, surveillance cameras, camera devices for monitoring production lines, remote-controlled robots, and unmanned air vehicles such as drones. If height measurement is possible, the present disclosure may be used in low-flying air vehicles. In such cases, parallel straight lines can be extracted from various objects such as two parallel sides of a box-shaped object like a building, and boundaries of linearly extending passage and walls. The terms such as "image", "image data", and "image information" may be replaced with other terms depending on situation.

REFERENCE SIGNS LIST 1 vehicle
10, 30, 50, 70 camera device
11, 31, 51 first camera
12, 32, 52 second camera
14, 37, 57 calculation device
15 input interface
16, 38, 59 controller
17 output interface
18 memory
19 calibrator
20 stereo calculation unit
21, 40, 60 calibration calculation unit
34a, 34b, 54a, 54b imaging unit
35a, 35b primary calibrator
36a, 36b primary calibration value memory
39 secondary calibrator
41 secondary memory
58 communication interface
55a, 55b calibrator
71a, 71b projector
100 road surface
101, 102 white line
103, 104 straight line
103L, 103R, 104L, 104R point group
105L, 105R, 106L, 106R approximate curve
107L, 107R, 108L, 108R approximate curve
109L, 109R, 110L, 110R approximate curve

The invention claimed is:

1. A calculation device comprising:
a controller configured to extract, from a captured image of a subject, a plurality of lines corresponding to straight lines parallel to each other located on a plane in the subject, to map the extracted plurality of lines to a three-dimensional coordinate space, and to calculate first calibration data so that mapping lines obtained are parallel to each other,
wherein the controller is configured to calibrate an angle $\theta_C$ between an optical axis of a camera that captures the image and the plane, based on the first calibration data, and
wherein the mapping of the plurality of lines to the three-dimensional coordinate space is conducted according to the following conversion expressions, when coordinate on the captured image expressed as a pixel value is (u, v), and coordinate on XZ-plane in the three-dimensional coordinate space corresponding to the plane is (X, Z), $$Z = H_C \cdot \frac{f - (v - v_0)p \cdot \tan\theta_C}{f \cdot \tan\theta_C - (v - v_0)p}$$

$$X = Z \cdot \frac{(u - u_0) \cdot p}{f}$$

where $(u_0, v_0)$ is a point on the optical axis of the camera in the captured image, $H_C$ is height of the camera from the plane, f is focal length of lens of the camera, and p is pixel pitch of the camera.

2. The calculation device according to claim 1,
wherein the controller is configured to:
calculate the first calibration data for each of a plurality of captured images of the same subject, the plurality of images having parallax therebetween; and
calculate second calibration data by comparing corresponding mapping lines in the plurality of images.

3. The calculation device according to claim 2,
wherein the controller is configured to perform calibration for a parallax deviation between a plurality of cameras that captures the plurality of images, based on the second calibration data.

4. A camera device comprising:
a calculation device including a controller configured to extract, from a captured image of a subject, a plurality of lines corresponding to straight lines parallel to each other located on a plane in the subject, to map the extracted plurality of lines to a three-dimensional coordinate space, and to calculate first calibration data so that mapping lines obtained are parallel to each other; and
one or more cameras configured to capture the image of the subject,
wherein the controller is configured to calibrate an angle $\theta_C$ between an optical axis of at least one camera of the one or more cameras that captures the image and the plane, based on the first calibration data, and
wherein the mapping of the plurality of lines to the three-dimensional coordinate space is conducted according to the following conversion expressions, when coordinate on the captured image expressed as a pixel value is (u, v), and coordinate on XZ-plane in the three-dimensional coordinate space corresponding to the plane is (X, Z), $$Z = H_C \cdot \frac{f - (v - v_0)p \cdot \tan\theta_C}{f \cdot \tan\theta_C - (v - v_0)p}$$

$$X = Z \cdot \frac{(u - u_0) \cdot p}{f}$$

where $(u_0, v_0)$ is a point on the optical axis of the at least one camera in the captured image, $H_C$ is height of the at least one camera from the plane, f is focal length of lens of the at least one camera, and p is pixel pitch of the at least one camera.

5. A vehicle comprising:
a calculation device including a controller configured to extract, from a captured image of a subject, a plurality of lines corresponding to straight lines parallel to each other located on a plane in the subject, to map the extracted plurality of lines to a three-dimensional coordinate space, and to calculate first calibration data so that mapping lines obtained are parallel to each other; and
one or more cameras configured to capture the image of the subject,
wherein the controller is configured to calibrate an angle $\theta_C$ between an optical axis of at least one camera of the one or more cameras that captures the image and the plane, based on the first calibration data, and
wherein the mapping of the plurality of lines to the three-dimensional coordinate space is conducted according to the following conversion expressions, when coordinate on the captured image expressed as a pixel value is (u, v), and coordinate on XZ-plane in the three-dimensional coordinate space corresponding to the plane is (X, Z), $$Z = H_C \cdot \frac{f - (v - v_0)p \cdot \tan\theta_C}{f \cdot \tan\theta_C - (v - v_0)p}$$

$$X = Z \cdot \frac{(u - u_0) \cdot p}{f}$$

where $(u_0, v_0)$ is a point on the optical axis of the at least one camera in the captured image, $H_C$ is height of the at least one camera from the plane, f is focal length of lens of the at least one camera, and p is pixel pitch of the at least one camera.

6. The vehicle according to claim 5, wherein the one or more cameras face outside the vehicle.

7. The vehicle according to claim 5, wherein the controller is configured to perform calibration based on the first calibration data, using a mounting angle of depression of each of the cameras as a reference value.

8. The vehicle according to claim 5, wherein the controller is configured to extract the plurality of straight lines from a ground portion in the image.

9. A calibration method comprising:
extracting, from a captured image of a subject, a plurality of lines corresponding to straight lines parallel to each other located on a plane in the subject;
mapping the extracted plurality of lines to a three-dimensional coordinate space; and
calculating first calibration data so that mapping lines obtained are parallel to each other,
wherein an angle $\theta_C$ between an optical axis of a camera that captures the image and the plane is calibrated, based on the first calibration data, and
wherein the mapping of the plurality of lines to the three-dimensional coordinate space is conducted according to the following conversion expressions, when coordinate on the captured image expressed as a pixel value is (u, v), and coordinate on XZ-plane in the three-dimensional coordinate space corresponding to the plane is (X, Z), $$Z = H_C \cdot \frac{f - (v - v_0)p \cdot \tan\theta_C}{f \cdot \tan\theta_C - (v - v_0)p}$$

$$X = Z \cdot \frac{(u - u_0) \cdot p}{f}$$

where $(u_0, v_0)$ is a point on the optical axis of the camera in the captured image, $H_C$ is height of the camera from the plane, f is focal length of lens of the camera, and p is pixel pitch of the camera.

10. The calibration method according to claim 9, comprising:
calculating the first calibration data for each of a plurality of images having parallax therebetween; and
calculating second calibration data by comparing corresponding mapping lines in the plurality of images.

* * * * *